United States Patent
Nos et al.

(10) Patent No.: US 10,353,886 B2
(45) Date of Patent: Jul. 16, 2019

(54) BIG DATA COMPUTING ARCHITECTURE

(71) Applicant: SAP SE, Walldorf (DE)

(72) Inventors: Karl-Peter Nos, Nussloch (DE); Klaus Kistl, Wiesloch (DE); Jan Pur, Oftersheim (DE); Andre Voigtmann, Plankstadt (DE); Stefan Ziegler, Waldsee (DE)

(73) Assignee: SAP SE, Walldorf (DE)

( * ) Notice: Subject to any disclaimer, the term of this patent is extended or adjusted under 35 U.S.C. 154(b) by 404 days.

(21) Appl. No.: 15/215,017

(22) Filed: Jul. 20, 2016

(65) Prior Publication Data
US 2018/0025037 A1    Jan. 25, 2018

(51) Int. Cl.
| | | |
|---|---|---|
| G06F 17/30 | (2006.01) | |
| G06Q 10/06 | (2012.01) | |
| G06F 16/22 | (2019.01) | |
| G06F 16/25 | (2019.01) | |

(52) U.S. Cl.
CPC ........ *G06F 16/2282* (2019.01); *G06F 16/258* (2019.01); *G06Q 10/063* (2013.01)

(58) Field of Classification Search
CPC ......... G06F 17/30194; G06F 17/30864; G06F 11/10; G06F 16/258; G06F 16/2282
See application file for complete search history.

(56) References Cited

U.S. PATENT DOCUMENTS

| | | | | |
|---|---|---|---|---|
| 8,874,561 | B2 * | 10/2014 | Heinzel | G06F 16/00 707/725 |
| 8,966,074 | B1 * | 2/2015 | Richards | H04L 47/10 709/224 |
| 9,183,560 | B2 * | 11/2015 | Abelow | G06Q 10/067 |
| 9,547,681 | B2 * | 1/2017 | Klauke | G06F 16/2282 |
| 2009/0024594 | A1 * | 1/2009 | Nolan | G06F 16/25 |
| 2013/0151491 | A1 * | 6/2013 | Gislason | G06F 16/2282 707/696 |
| 2014/0289183 | A1 * | 9/2014 | Dipper | G06F 16/283 707/602 |
| 2015/0242400 | A1 * | 8/2015 | Bensberg | G06F 16/2282 707/615 |
| 2015/0289149 | A1 * | 10/2015 | Ouyang | H04W 24/02 370/252 |
| 2016/0162535 | A1 * | 6/2016 | Peterson | G06F 16/2282 707/696 |
| 2016/0269908 | A1 * | 9/2016 | Richards | H04W 12/12 |
| 2016/0306810 | A1 * | 10/2016 | Ni | G06F 17/30082 |

(Continued)

*Primary Examiner* — Hasanul Mobin
(74) *Attorney, Agent, or Firm* — Jones Day (57) ABSTRACT

Raw data is received that characterizes each of a plurality of transactions. The data can be received, for example, via an adapter coupled to at least one data source. At least one first table is populated using the raw data according to a normalized data model. At least one second table is then populated, by applying a key figure data model to transform and enrich the at least one first table, such that it is optimized for data analysis operations. The at least one second table can include a subset of data stored in the at least one first table and additional enrichment data. At least one data analysis operation can later be initiated on the data populated in at least one second table to characterize one or more aspects of the transactions. Data can be provided that characterizes the initiated at least one data operation.

20 Claims, 6 Drawing Sheets

(56) References Cited

U.S. PATENT DOCUMENTS

2016/0335182 A1* 11/2016 Teodorescu ....... G06F 17/30368
2016/0350371 A1* 12/2016 Das ................... G06F 16/24542
2017/0255690 A1*  9/2017 Chau ................. G06F 17/30598

* cited by examiner

Table Name:
sap.bdpt.hana.repository::CostPerUnit.COST_PER_UNIT

| Columns | Indexes | Further Properties | Runtime Information |

| | Name | SQL Data Type | Di... | Column Store Data Type | Key | Not Null |
|---|---|---|---|---|---|---|
| 1 | ROW_ID | INTEGER | | INT | X(1) | X |
| 2 | COST_ID | INTEGER | | INT | | X |
| 3 | VALID_FOR_START_DATE | DATE | | DAYDATE | | |
| 4 | DESCRIPTION | NVARCHAR | 150 | STRING | | |
| 5 | COST_VOLUME | DOUBLE | | DOUBLE | | X |
| 6 | COST_DURATION | DOUBLE | | DOUBLE | | X |
| 7 | COST_EVENT | DOUBLE | | DOUBLE | | X |
| 8 | COST_PERIOD | DOUBLE | | DOUBLE | | X |
| 9 | COST_REV_PERCENTAGE | DOUBLE | | DOUBLE | | X |
| 10 | SOURCE | NVARCHAR | 40 | STRING | | |
| 11 | RUN_TIMESTAMP | SECONDDATE | | SECONDDATE | | |
| 12 | RUN_ID | NVARCHAR | 20 | STRING | | |

BIG DATA COMPUTING ARCHITECTURE

TECHNICAL FIELD

The subject matter described herein relates to a computing architecture optimized for evaluation of large data sets.

BACKGROUND

As the amount of data generated by enterprises continues to grow, so does the complexity in providing rapid and meaningful evaluations of such data. These difficulties are compounded, in part, based on the storage requirements for such data which, in turn, can make it more difficult to evaluate such data at different granularity levels.

SUMMARY

In one aspect, raw data is received that characterizes each of a plurality of transactions. The data can be received, for example, via an adapter coupled to at least one data source. At least one first table is populated using the raw data according to a normalized data model. At least one second table is then populated, by applying a key figure data model to transform and enrich the at least one first table, such that it is optimized for data analysis operations. The at least one second table can include a subset of data stored in the at least one first table and additional enrichment data. At least one data analysis operation can later be initiated on the data populated in at least one second table to characterize one or more aspects of the transactions. Data can be provided that characterizes the initiated at least one data operation.

The at least one second table can be loaded into memory of an in-memory database. The at least one first table can be persisted in physical storage that is separate and distinct from the in-memory database. In other variations, the at least one first table can be loaded into memory of the in-memory database.

The at least one data analysis operation can include splitting and grouping data populated in the plurality of second tables.

The at least one data analysis operation can include calculating properties, distributions and/or statistics on a subset of the data populated in the plurality of second tables, and/or evaluating and categorizing data populated in the plurality of second tables.

The provision of data can include one or more of: displaying at least a portion of the provided data in an electronic display device, loading at least a portion of the provided data into memory, persisting at least a portion of the provided data into physical data storage, or transmitting at least a portion of the provided data to a remote computing system.

The transactions can pertain to a wide variety of applications. In one example, the transactions relate to the usage of a mobile communication device using a communications network by each of a plurality of subscribers. The provided data in such variations can characterize an amount of revenue for at least one subscriber.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. In particular, the current subject matter provides for an enhanced computing architecture and related methods for providing more rapid evaluations of big data sets while, at the same time, utilizing fewer processing resources. For in-memory computing systems, the current subject matter can be implemented such that only small subsets of a much larger data set are required in order to evaluate the data. Moreover, the current subject matter is advantageous in that it provides for a standard data model and more efficient reporting capabilities. Lastly, the current subject matter is also advantageous in that the architecture allows for increased ability for enhancement and increased decoupling by allowing for only certain parts of the underlying components of a target architecture to be utilized depending on the desired application.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
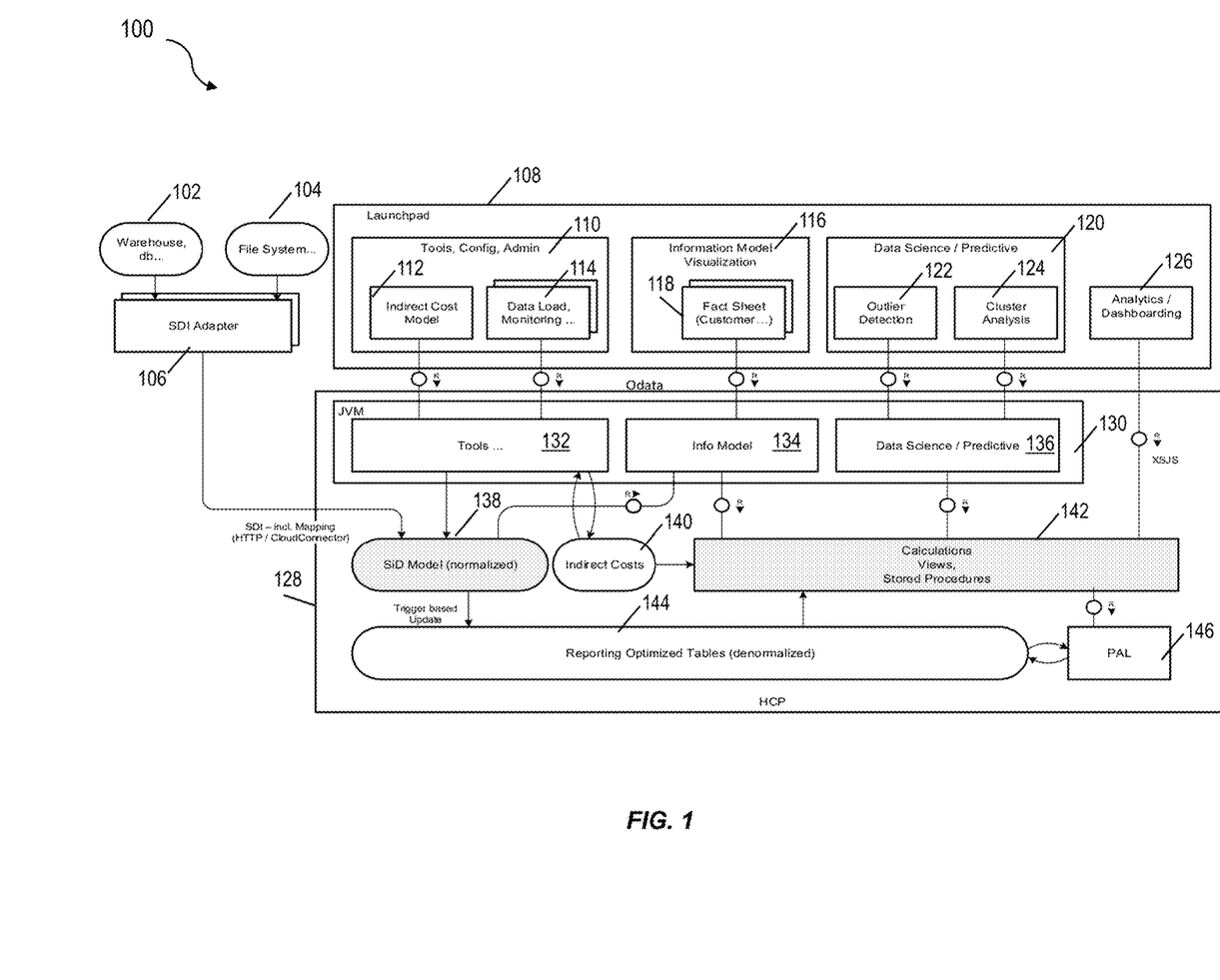
FIG. 1 is a system diagram illustrating a computing architecture optimized for evaluations of large data sets.

The current subject matter is directed to a computing architecture and related methods and computer program products for rapidly providing meaningful evaluations of large data sets. FIG. 1 is a diagram 100 of a big data computing architecture that can incorporate a database cloud platform (DBCP) 128 such as the SAP HANA Cloud Platform. The DBCP 128 can utilize data from a variety of sources including a data warehouse 102 and a file system 104 (data feeds and the like can also be used). These data sources 102, 104 can store/load data (e.g., raw data, etc.) in heterogeneous formats such that a smart data integration (SDI) adapter 106 can, using pre-defined mapping logic, map, optimize, cleans, and/or load the data into a uniform reference data model (URDM) tables 138 (i.e., a normalized data model, etc.) forming part of the DBCP 128. The DBCP 128 can be an and/or include in-memory database and, in some cases, a column-oriented in-memory database. The data in the URDM tables 138 is stored in tables having many foreign key relations which stores significantly more data than may be required during typical evaluations. The URDM tables 138 can comprise a huge data pool including dozens to hundreds of relational tables because they can reflect a huge data tree (e.g., the SDI model, etc.). The URDM tables 138 can be used (and are useful) when analyzing the performance of the hardware executing the transactions (i.e. telecom network activities, etc.). However, when it is desired to analyze transactions in relation to the originators of the transactions (e.g., individual customers, etc.) or in relation to the type of transactions (e.g., individual network events, e.g. calls, SMS, etc.), too much processing time and resources are required. The reason for these excessive processing times lies in the fact that the originator or type of the transaction is stored too deep down in the data tree so that too many tables need to be accessed and handled concurrently during the reading and processing. Further, for purposes of analyzing the transaction with regard to originator or type, some information may be missing altogether.

Given the issues described above, the data in the URDM tables 138 can be replicated and enriched into reporting optimized tables 144 (i.e., de-normalized tables). The enrichment can be, for example, adding additional direct and indirect key figures (as part of processing logic defined by a key figure data model, etc.) to the URDM tables 138 that are generated from calculations from data encapsulated in the URDM tables 138. The processing logic can be such that it is reusable and the like.

The reporting optimized tables 144 can be or include a single flat table. In some variations, the URDM tables 138 and the reporting optimized tables are not within the same computing system (e.g., the URDM tables 138 can be, for example, in separate persistence, etc.). In addition, it will be appreciated that there can be a single URDM table 138 and/or a single reporting optimized table 144. The reporting optimized tables 144 can be fact tables that are de-normalized in such a fashion as to provide more rapid enhanced evaluation. The reporting optimized tables 144 can be columnar (i.e., column-oriented) tables with little or no redundancy amongst the tables. Various database triggers can be used to ensure that the reporting optimized table 144 is updated when certain changes are made to the SID model 138.

The replication/enrichment to form the reporting optimization tables 144 can include or otherwise be manipulated by various functions/algorithms from a predictive analytics library (PAL) 146.

Various calculations, database views, and stored procedures 142 (to enable outlier analysis, clustering, and other evaluations, etc.) can be performed using the reporting optimized tables. In some variations, external information 140 can also be utilized in generating the calculations, database view, and stored procedures, etc. In a telecommunications example, such as that described below, the external information 140 can be indirect costs such as infrastructure costs for adding network capacity as pro-rated amongst subscriber, call length, or other criteria. The calculations, database views and stored procedures 142 can implement or otherwise utilize various operations including, for example, splitting and grouping data of the data stored according to normalized data model 138 (similar to outlier analysis), calculating properties, distributions and statistics on subsets of the data according to the normalized data model 138 (e.g., peer group view, service distribution or margin breakdown, etc.), and/or evaluation and categorization of data (such as creating an alert for unprofitable subscriptions or doing association rule mining). All these steps can be scheduled for reoccurring processing. This component 142 need not contain the various processing and calculation methods itself; rather, it can only provide services and a set of APIs to ensure re-usability of reoccurring requirements. The component 142 can also ensure that the output of each "split and group" processing step can get used as input for any other processing step. Results of the calculations can serve as input for further processing.

A set of data science methods can be provided and it is also possible to easily add more methods. The methods can get executed in any layer, but all methods share common input and output tables. As the output of a method can be the input of other methods, the input-output structures needs to be identical.

Various applications and user interfaces (UIs) can be applied to the calculations, database views, and stored procedures 142. For example, the DBCP 128 can interact with a visualization launchpad 108 that, in turn, can include various UI modules. For example, there can be various tools, configuration, administration modules 110 that utilize an external information model 112 and/or data load monitoring 114. The launchpad 108 can additionally include an information model visualization module 116 which can utilize fact sheets 118 or other contextual information used in an overall transaction or the like. Further, there can also be data science/predictive modules 120 that utilize information such as outlier detections 122 and/or cluster analyses 124. In addition, other analytics module 126 can be utilized by the launchpad 108.

The launchpad 108 can interface with the DBCP 128 via a JAVA Virtual Machine 130 that includes instantiations of the tools, configuration, administration modules 132, the information model visualization modules 134, and the data science/predictive modules 136.

The computing architecture of FIG. 1 can be used in a variety of applications. In one example, the computing architecture can be used in connection with rapidly determining the margin and profitability per user within a large scale telecommunications network in which there are variations in the costs/tariffs for each call given the underlying contract governing usage of a mobile device (e.g., mobile phone, tablet, mobile WiFi, etc.). The usage of a mobile phone, unless otherwise specified, can be referred to as a transaction. It will be appreciated that the current subject matter can be used for other applications such as utilities and other industries in which there are a large number of users having different contracts/pricing relationships with the service provider.

Figure 2:
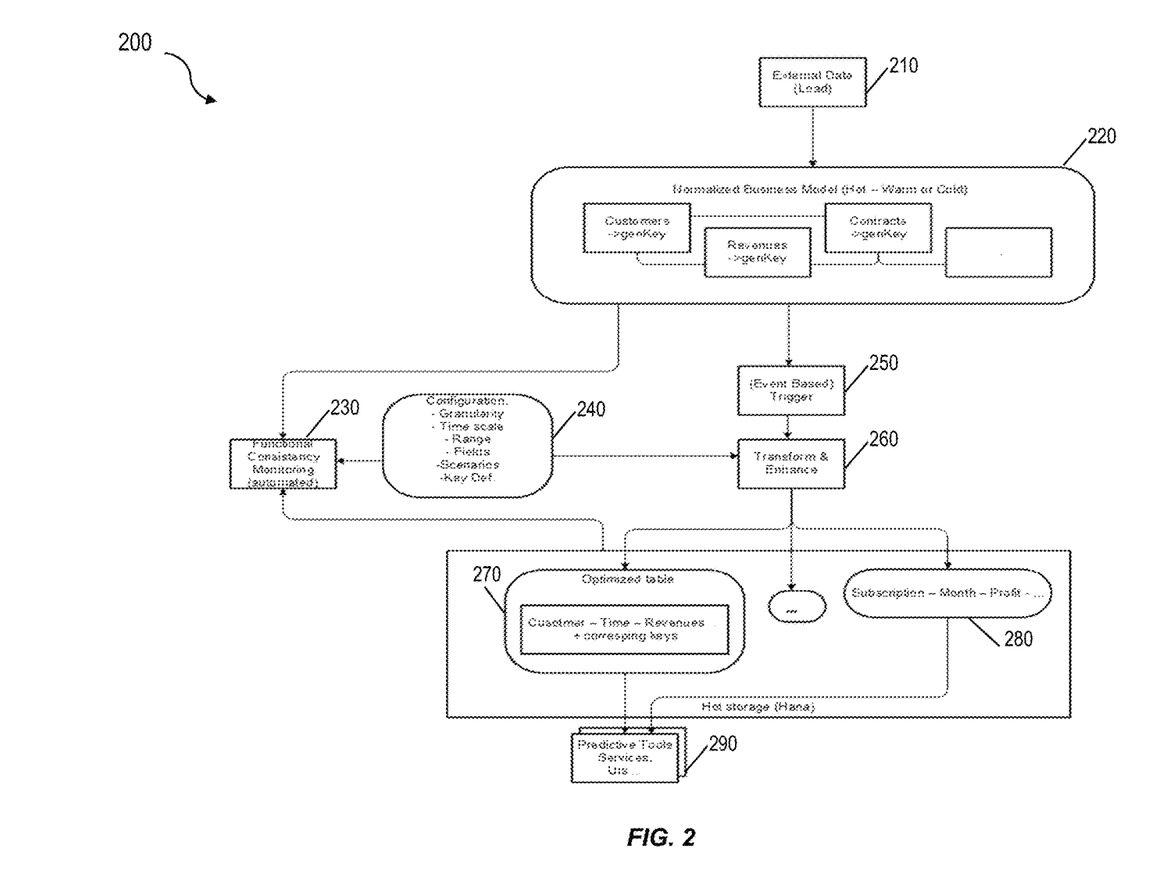
FIG. 2 is a logical diagram of data relationships in a computing architecture for evaluation of large data sets.

FIG. 2 is a diagram 200 illustrating a logical diagram in which data is obtained from a data source 210 (e.g., data feed, persistence, etc.) and populated into normalized data model 220. The normalized data model 220 can stored in any of hot (in-memory database system, etc.), warm (e.g., relational store providing less than real-time access, etc.), or cold (physical persistence for archiving, etc.) storage. Hot, warm, and cold in this context relates to speed of access of the data within such storage. In this case of telecommunications cost analyses, the normalized data model 220 can be at least one table including keys for customers, revenues, contracts, and the like. Database triggers 250 can be implemented such that changes to data populated in the tables of the normalized data model 220 can be transformed and enhanced 260 to form an optimized table(s) 270 based on, for example, customer, time, revenue, and the corresponding keys from the normalized data model 220. Functional consistency monitoring 230 can also be implemented to ensure that various configuration metrics 240 are consistent between the normalized data model 220 and the optimized table 270. The optimized table 270 can be stored in hot storage (e.g., in-memory column-oriented database, etc.). Various predictive tools 290 can access the optimized table 270 and other information 280 (e.g., subscription, month, profit, etc.) to perform various data analysis operations to assess profitability of subscribers at different granularity levels across various metrics.

Figure 3:
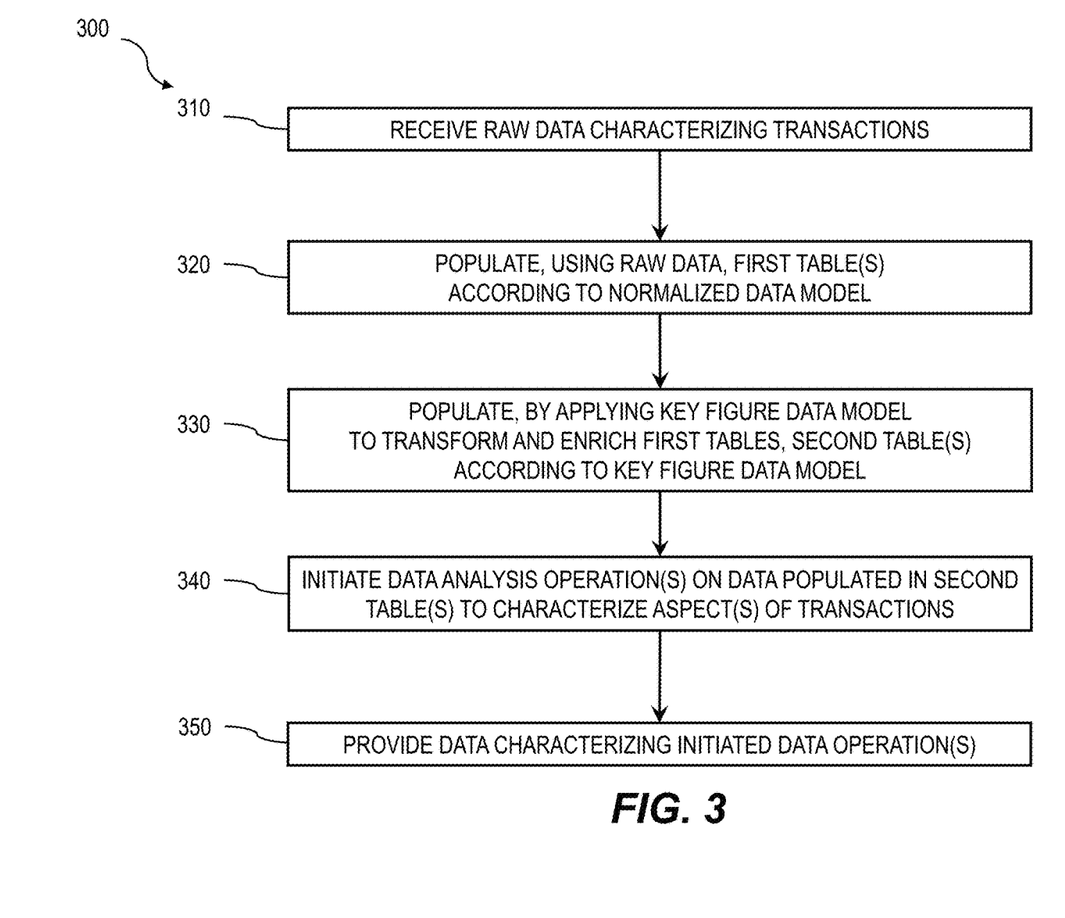
FIG. 3 is a process flow diagram illustrating evaluation of large data sets.

FIG. 3 is a process flow diagram 300 in which, at 310, raw data is received via an adapter that characterizes each of a plurality of transactions. The adapter is coupled to at least one data source. Thereafter, using the raw data, at least one first table is populated, at 320, according to a normalized data model. Subsequently, at 330, at least one second table is populated by applying a key figure data model to the at least one first table. The at least one second table is optimized for data analysis operations and comprises a subset of data stored in the plurality of tables. Later, at 340, at least one data analysis operation on the data populated in at least one second table is initiated to characterize one or more aspects of the transactions. Data can then be provided, at 350, that characterized the initiated at least one data operation.

The at least one data analysis operation can include one or more of: splitting and grouping data populated in the plurality of second tables, calculating properties, distributions and/or statistics on a subset of the data populated in the plurality of second tables, and/or evaluating and categorizing data populated in the plurality of second tables.

Figure 4:
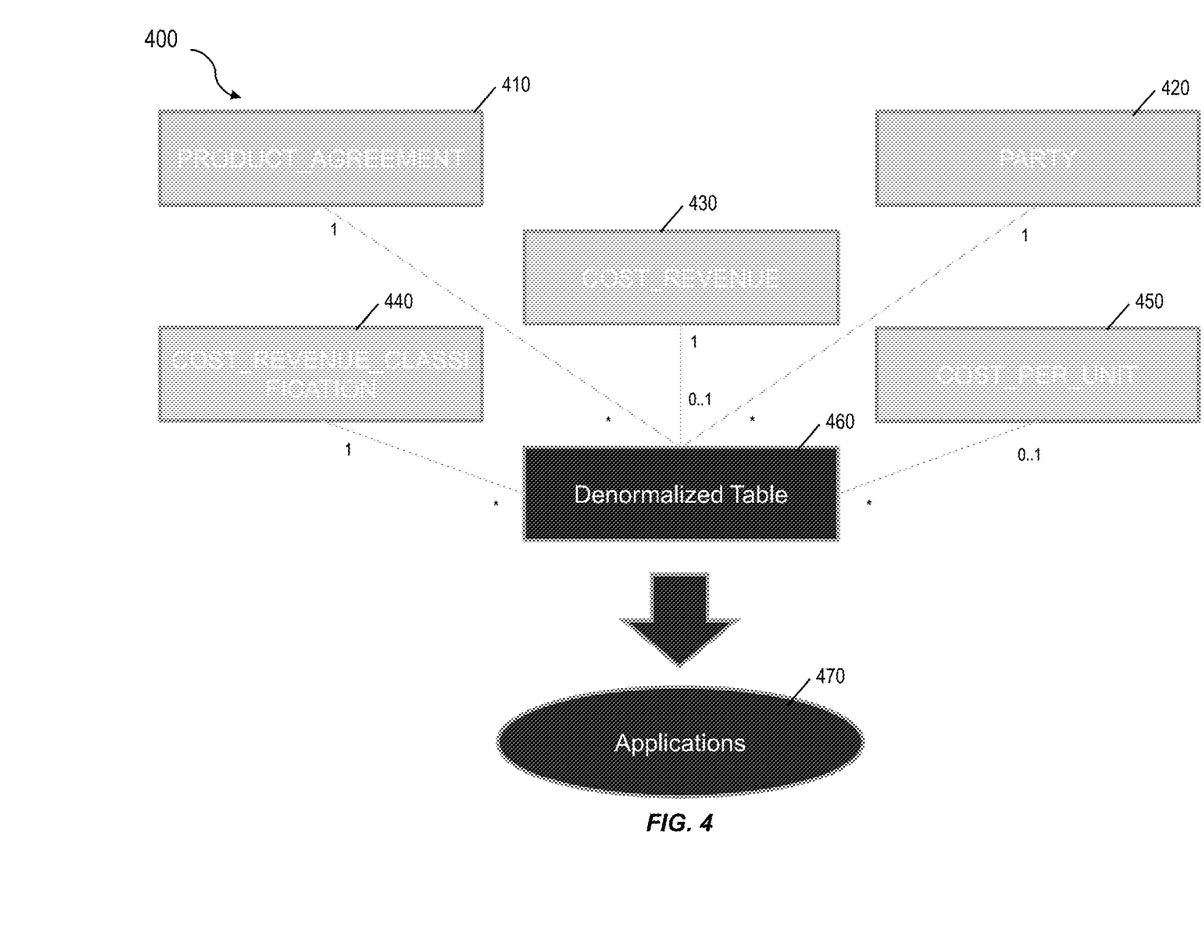
FIG. 4 is a diagram illustrating a data model for determining costs associated with mobile device telecommunications subscriber usage.

FIG. 4 is a diagram 400 of a data model that can be utilized by the computing architecture of FIG. 1 and/or the data relationship of FIG. 2 in order to evaluate cost data of telecommunications subscribers. The data model can join various information into a de-normalized table 460 for ultimate use by one or more applications 470. The information can include, for example, product agreements 410 for each subscriber (contracts containing usage rate information, etc.), party information 420 characterizing the subscriber, cost revenue 430 associated with each subscriber, cost revenue classification information 440 for each subscriber, and cost per unit (i.e., mobile computing device) 450.

The original (i.e., "raw") telecommunications model of FIG. 4, sometimes referred to as "SID"-inspired or "ABDR" is highly normalized. The data model is also the inbound API for to load data. This data is used by the computing architecture in all scenarios where analysis of single entities is required (customer fact Sheet, product fact sheet, etc.).

A key figure model can define how margin and other key figures are calculated. Indirect cost, hierarchies, and the like including the needed data granularity can be defined in this component. From an SID/ABDR perspective, this model is only a calculation scheme without persistency.

A set of de-normalized tables, forming a foundation for most analysis steps which are needed (which is provided in the architecture of FIG. 1 and in FIG. 2). Data can be kept synchronized with the original raw SID/ABDR model via database triggers. The structure of these tables can be optimized for the main use cases. For additional requirements it is possible to define additional tables beyond the main use cases.

During the synchronization the cost and key figure model can be applied and the results can be persisted as part of the foundation model. Dashboard-like UIs in the launchpad 108 can consume the reporting optimized tables 144 of the foundation layer.

Figure 5:
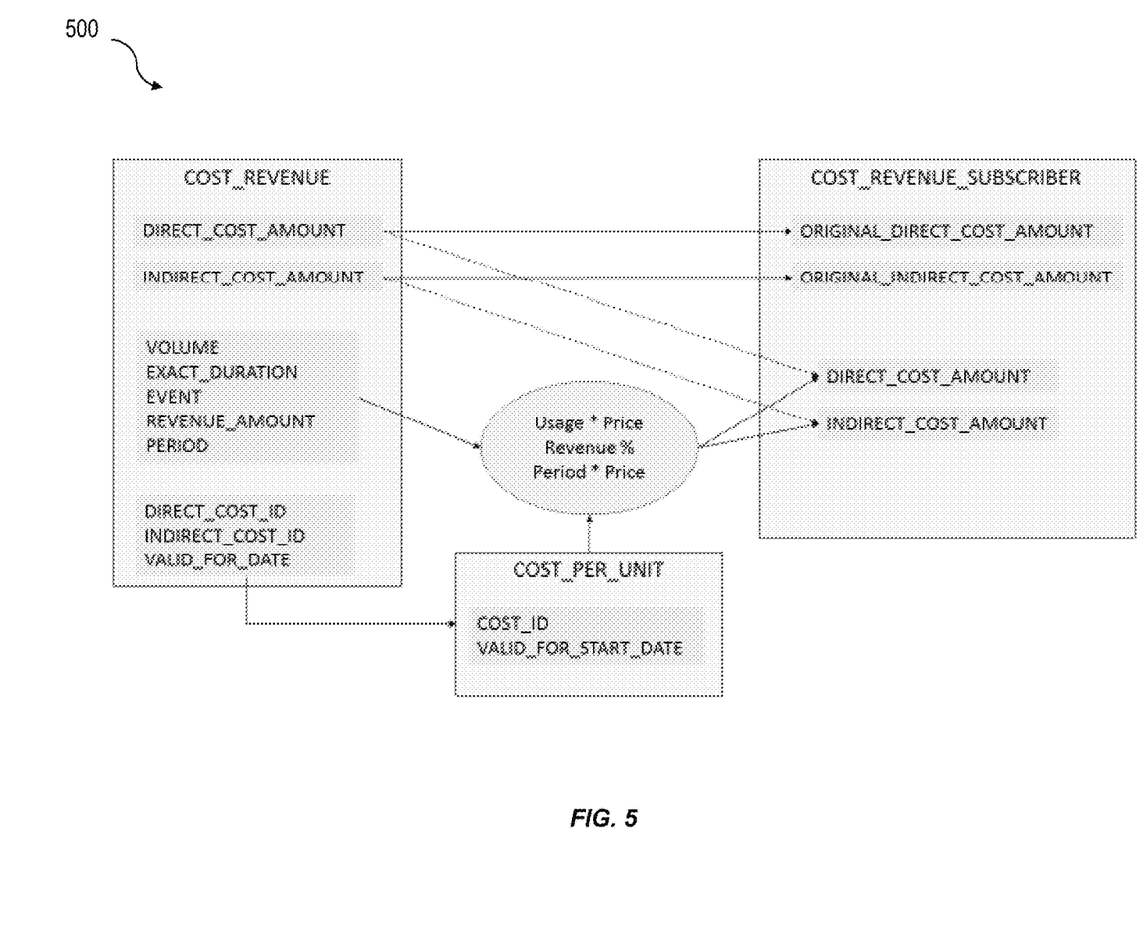
FIG. 5 is a diagram illustrating cost revenues per subscriber in a telecommunications network.

FIG. 5 is a diagram 500 illustrating the calculation of direct and indirect costs of telecommunications subscribers (e.g., millions of subscribers and their associated data, etc.) using Table COST_PER_UNIT. These calculations can be performed, for example, using the computing architecture of FIG. 1. With this variation, costs can be calculated while distributing imported data from table COST_REVENUE to table COST_REVENUE_SUBSCRIBER. Not only is the calculation of indirect costs is supported with this arrangement, but the calculation of direct costs is supported. This arrangement is helpful if a user cannot provide direct costs from an external source. Moreover, with this variation, the calculations are time-dependent so that they can be used, for example, to reflect monthly changes of interoperator tariffs. Further, with this arrangement, costs can not only be calculated depending on usage (duration, volume, events, etc.) but, they can be also calculated as a percentage of revenue (e. g. for value-added services, etc.). Still further, the period length (e. g. 1 month or a fraction of a month, etc.) can be used to calculate time-dependent costs.

Figure 6:
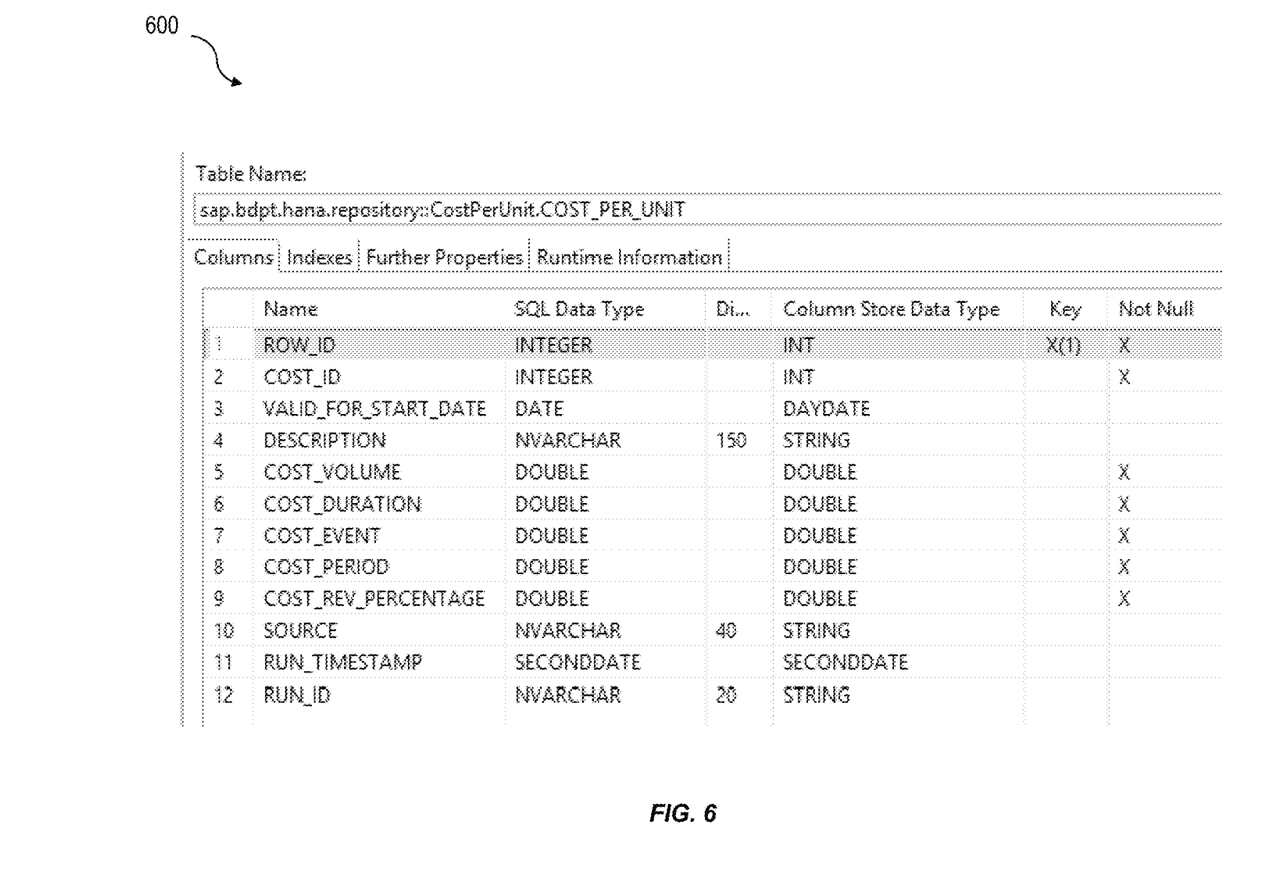
FIG. 6 is a diagram illustrating an example reporting optimized table for use in determining costs associated with mobile telecommunication subscriber usage.

With reference to diagram 600 of FIG. 6, in table sap.bdpt.hana.repository::CostRevenue.COST_REVENUE (abbreviated: CR) there are columns DIRECT_COST_AMOUNT and INDIRECT_COST_AMOUNT. These columns can be filled with direct and indirect costs in case the user can provide the values. During the distribution step the values can be copied to columns ORIGINAL_DIRECT_COST_AMOUNT and ORIGINAL_INDIRECT_COST_AMOUNT in table sap.bdpt.hana.repository::CostRevenueSubscriber.COST_REVENUE_SUBSCRIBER (abbreviated: CRS) without any change.

The cost calculation for direct costs can be triggered by column DIRECT_COST_ID (table CR). It can be checked whether there is an entry in table sap.bdpt.hana.repository::CostPerUnit.COST_PER_UNIT (abbreviated: CPU) with the same value for column COST_ID:

$$CR.DIRECT\_COST\_ID = CPU.COST\_ID \qquad (1)$$

In addition the following condition must hold to account for historic changes:

$$CR.VALID\_FOR\_DATE >= CPU.VALID\_FOR\_START\_DATE \qquad (2)$$

If there is more than one entry in table CPU (FIG. 5) which fulfills condition (1), the entry with maximum value for CPU.VALID_FOR_START_DATE which fulfills condition (2) can be taken. The parameters from table CPU can be used to calculate the direct costs. The formula for this calculation can be as follows:

$$\begin{aligned}CRS.DIRECT\_COST\_AMOUNT =& -(CR.VOLUME* \\ & CPU.COST\_VOLUME + CR.EXACT\_DURA\text{-} \\ & TION* CPU.COST\_DURATION+ \\ & CR.EVENT*CPU.COST\_EVENT+ \\ & CR.PERIOD*CPU.COST\_PERIOD+ \\ & CR.REVENUE\_AMOUNT* \\ & CPU.COST\_REV\_PERCENTAGE*0.01).\end{aligned}$$

The calculated value can be copied to column DIRECT_COST_AMOUNT in table CRS. In cases in which cost calculation is not possible, CR. DIRECT_COST_AMOUNT can be copied to CRS.DIRECT_COST_AMOUNT.

The calculation of indirect costs can be performed in a similar manner. The other cost identifier can be utilized:

$$CR.INDIRECT\_COST\_ID = CPU.COST\_ID \qquad (1')$$

The calculation of direct and indirect costs are independent of each other. It is possible that indirect costs are calculated but no direct costs or vice versa.

Note that in a subsequent step filter conditions can be applied on CRS. DIRECT_COST_AMOUNT and CRS. INDIRECT_COST_AMOUNT.

Entries for direct costs need not be explicitly distinguished from entries for indirect costs. The meaning of a COST_ID can be documented in column DESCRIPTION. One entry may even be used for both purposes. This is possible if the user fills CR.DIRECT_COST_ID and CR.INDIRECT_COST_ID with the same value.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touchscreen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
receiving, via an adapter, raw data characterizing each of a plurality of transactions, the adapter being coupled to at least one data source;
populating, using the raw data, at least one first table according to a normalized data model;
detecting changes in the at least one first table using database triggers;
populating, by applying a key figure data model to transform and enrich the at least one first table, at least one second table that is de-normalized and optimized for data analysis operations, the at least one second table being populated by replicating a subset of data stored in the at least one first table and providing additional enrichment data derived from the application of the key figure data model, the key figure data model defining how key figures are calculated, the additional enrichment data including direct and indirect key figures generated from calculations from data encapsulated in the at least one first table;
initiating at least one data analysis operation on the data populated in at least one second table to characterize one or more aspects of the transactions; and providing data characterizing the initiated at least one data operation;
wherein:
the at least one second table is populated in response to the detected changes in the at least one first table;
the at least one first table is persisted in physical data storage separate and distinct from the in-memory database.

2. The method of claim 1, wherein the at least one second table is loaded into memory of an in-memory database.

3. The method of claim 1, wherein the at least one data analysis operation comprises splitting and grouping data populated in the plurality of second tables.

4. The method of claim 1, wherein the at least one data analysis operation comprises calculating properties, distributions and/or statistics on a subset of the data populated in the plurality of second tables.

5. The method of claim 1, wherein the at least one data analysis operation comprises evaluating and categorizing data populated in the plurality of second tables.

6. The method of claim 1, wherein the providing data comprises at least one of: displaying at least a portion of the provided data in an electronic display device, loading at least a portion of the provided data into memory, persisting at least a portion of the provided data into physical data storage, or transmitting at least a portion of the provided data to a remote computing system.

7. The method of claim 1, wherein the transactions comprises usage of a mobile communication device using a communications network by each of a plurality of subscribers.

8. The method of claim 7, wherein the provided data characterizes an amount of revenue for at least one subscriber.

9. A system comprising:
at least one data processor;
memory storing instructions which, when executed by the at least one data processor, result in operations comprising:
receiving, via an adapter, raw data characterizing each of a plurality of transactions, the adapter being coupled to at least one data source;
populating, using the raw data, at least one first table according to a normalized data model;
detecting changes in the at least one first table using database triggers;
populating, by applying a key figure data model to transform and enrich the at least one first table, at least one second table that is de-normalized and optimized for data analysis operations, the at least one second table being populated by replicating a subset of data stored in the at least one first table and providing additional enrichment data derived from the application of the key figure data model, the key figure data model defining how key figures are calculated, the additional enrichment data including direct and indirect key figures generated from calculations from data encapsulated in the at least one first table;
initiating at least one data analysis operation on the data populated in at least one second table to characterize one or more aspects of the transactions; and
providing data characterizing the initiated at least one data operation;
wherein:
the at least one second table is populated in response to the detected changes in the at least one first table;
the at least one first table is persisted in physical data storage separate and distinct from the in-memory database.

10. The system of claim 9, further comprising an in-memory database wherein the at least one second table is loaded into memory of the in-memory database.

11. The system of claim 9, wherein the at least one data analysis operation comprises splitting and grouping data populated in the plurality of second tables.

12. The system of claim 9, wherein the at least one data analysis operation comprises calculating properties, distributions and/or statistics on a subset of the data populated in the plurality of second tables.

13. The system of claim 9, wherein the at least one data analysis operation comprises evaluating and categorizing data populated in the plurality of second tables.

14. The system of claim 9, wherein the providing data comprises at least one of: displaying at least a portion of the provided data in an electronic display device, loading at least a portion of the provided data into memory, persisting at least a portion of the provided data into physical data storage, or transmitting at least a portion of the provided data to a remote computing system.

15. The system of claim 9, wherein the transactions comprises usage of a mobile communication device using a communications network by each of a plurality of subscribers.

16. The system of claim 15, wherein the provided data characterizes an amount of revenue for at least one subscriber.

17. A non-transitory machine-readable medium storing instructions which, when executed by at least one data processor, result in operations comprising:
receiving, via an adapter, raw data characterizing each of a plurality of transactions, the adapter being coupled to at least one data source;
populating, using the raw data, at least one first table according to a normalized data model;
detecting changes in the at least one first table using database triggers;
populating, by applying a key figure data model to transform and enrich the at least one first table, at least one second table that is de-normalized and optimized for data analysis operations, the at least one second table being populated by replicating a subset of data stored in the at least one first table and providing additional enrichment data derived from the application of the key figure data model, the key figure data model defining how key figures are calculated, the additional enrichment data including direct and indirect key figures generated from calculations from data encapsulated in the at least one first table;
initiating at least one data analysis operation on the data populated in at least one second table to characterize one or more aspects of the transactions; and
providing data characterizing the initiated at least one data operation;
wherein:
the at least one second table is populated in response to the detected changes in the at least one first table;
the at least one first table is persisted in physical data storage separate and distinct from the in-memory database.

18. The non-transitory machine-readable medium of claim 17, wherein the providing data comprises at least one of: displaying at least a portion of the provided data in an electronic display device, loading at least a portion of the provided data into memory, persisting at least a portion of the provided data into physical data storage, or transmitting at least a portion of the provided data to a remote computing system.

19. The non-transitory machine-readable medium of claim 17, wherein the transactions comprises usage of a mobile communication device using a communications network by each of a plurality of subscribers.

20. The non-transitory machine-readable medium of claim 19, wherein the provided data characterizes an amount of revenue for at least one subscriber.

\* \* \* \* \*